United States Patent
Alupei et al.

(10) Patent No.: US 7,956,094 B2
(45) Date of Patent: Jun. 7, 2011

(54) SELF-STERILIZED, ANTISEPTIC COLLAGEN PREPARATIONS, THEIR USE AND METHODS FOR PRODUCING THEM

(75) Inventors: Corneliu Iulian Alupei, Neuwied (DE); Marius-Thomas Gorka, Koblenz (DE); Peter Ruth, Melsbach (DE); Christian Rohrer, Linz (AT); Helmut Leuprecht, Vienna (AT)

(73) Assignee: Lohmann & Rauscher GmbH & Co. KG, Neuwied (DE)

( * ) Notice: Subject to any disclaimer, the term of this patent is extended or adjusted under 35 U.S.C. 154(b) by 367 days.

(21) Appl. No.: 11/911,900

(22) PCT Filed: Apr. 18, 2006

(86) PCT No.: PCT/EP2006/003520
§ 371 (c)(1),
(2), (4) Date: May 12, 2008

(87) PCT Pub. No.: WO2006/111347
PCT Pub. Date: Oct. 26, 2006

(65) Prior Publication Data
US 2008/0255241 A1 Oct. 16, 2008

(30) Foreign Application Priority Data
Apr. 18, 2005 (DE) .......... 10 2005 017 845

(51) Int. Cl.
*A01N 37/52* (2006.01)
*A61K 31/155* (2006.01)
*B29C 44/34* (2006.01)
*C08J 9/14* (2006.01)

(52) U.S. Cl. .......... 514/635; 264/53

(58) Field of Classification Search .......... None
See application file for complete search history.

(56) References Cited

U.S. PATENT DOCUMENTS

| 4,614,794 | A | | 9/1986 | Easton et al. |
| 4,786,436 | A | * | 11/1988 | Ogunbiyi et al. .......... 516/203 |
| 5,516,395 | A | * | 5/1996 | Anhauser et al. .......... 156/242 |
| 6,177,480 | B1 | * | 1/2001 | Tsuzuki et al. .......... 516/79 |
| 2002/0061842 | A1 | | 5/2002 | Mansour |
| 2005/0260251 | A1 | | 11/2005 | Hiltner et al. |
| 2006/0018847 | A1 | | 1/2006 | Kroepke et al. |

FOREIGN PATENT DOCUMENTS

| DE | 296 11 266 | * 10/1996 |
| DE | 10 2005 008 416 A1 | 9/2006 |
| EP | 0048558 B1 | 6/1987 |
| EP | 0140596 B1 | 6/1988 |
| EP | 0562862 B1 | 9/1993 |
| EP | 0901795 A3 | 3/1999 |
| EP | 1593399 A2 | 11/2005 |
| GB | 1515963 | 6/1978 |
| GB | 2280850 A | 2/1995 |
| JP | 8119805 A | 5/1996 |
| RU | 2118176 C1 | 8/1998 |
| WO | 90/06138 A1 | 6/1990 |
| WO | 99/52946 | 10/1999 |
| WO | 01/64046 A2 | 9/2001 |
| WO | 03/004013 A1 | 1/2003 |
| WO | 2004/032945 A1 | 4/2004 |
| WO | 2006/089660 A2 | 8/2006 |

* cited by examiner

*Primary Examiner* — Marcela M Cordero Garcia
(74) *Attorney, Agent, or Firm* — Panitch Schwarze Belisario & Nadel LLP

(57) ABSTRACT

A method is provided for sterilizing a collagen preparation and for production of self-sterilized, antiseptic collagen preparations. The preparations may be used for producing collagen products, such as sponges, films or gels, especially for medical and/or cosmetic purposes.

18 Claims, No Drawings

SELF-STERILIZED, ANTISEPTIC COLLAGEN PREPARATIONS, THEIR USE AND METHODS FOR PRODUCING THEM

CROSS-REFERENCE TO RELATED APPLICATIONS

This application is a Section 371 of International Application No. PCT/EP2006/003520, filed Apr. 18, 2006, which was published in the German language on Oct. 26, 2006, under International Publication No. WO 2006/111347 A1 and the disclosure of which is incorporated herein by reference.

BACKGROUND OF THE INVENTION

The present invention relates to a method for sterilizing collagen preparations and to the production of self-sterilized, antiseptic collagen preparations, to their use for producing collagen products, such as sponges, films or gels, especially for medical and/or cosmetic purposes, and to the products produced from the self-sterilized collagen preparations.

Collagen is the most important fibrous component of the skin, bones, tendons, cartilage and blood vessels. Collagen is a structural protein and is characterized by an extraordinary amino acid composition. Thus, the portion of glycine residues of the polypeptide chain amounts to almost one third, the portion of proline is higher than in most proteins, and collagen is characterized by the presence of the amino acids 4-hydroxyproline and 5-hydroxylysine, which are found in very few other proteins. In its native form, collagen occurs as a triple-stranded helix (triple helix) being stabilized by the formation of crosslinks within and between the tropocollagen molecules which form collagen.

Collagen is a biodegradable as well as biocompatible protein which is used as a starting material for manifold applications in the food industry, in the pharmaceutical and cosmetic industries, as well as in medicine. A large number of collagen products are already known, for example, sponges, wound dressings, films, membranes or gels, which are also used in medicine.

European patent publication EP 0 901 795, for example, describes collagen sponges having a solid hydrogen phosphate/dihydrogen phosphate buffer, and their use as wound dressings. This wound dressing, which is provided with a weak, water-soluble, acid buffer system, is to be utilized to maintain the pH value of the wound surface within the acid range, that is, at pH values between 3.5 and 6.5.

European patent publication EP 0 562 862 describes bioabsorbable sponge materials as wound implants. These sponge materials comprise a collagen matrix which comprises oriented substructures. The matrix and/or substructures may comprise oxidized regenerated cellulose.

British patent specification GB 2 280 850 describes implants provided with an active substance, for treating periodontal diseases, the implants comprising a collagen film reinforced with a layer of a biodegradable polymer, which may be oxidized regenerated cellulose. The collagen matrix may also contain fibers or fragments of oxidized regenerated cellulose which are dispersed in the matrix.

British patent specification GB 1 515 963 discloses a material based on collagen for surgical and other medical applications, for blood vessel transplants and other types of endoprostheses, the collagen being crosslinked with mucopolysaccharides. This material contains at least 5 percent by weight of a mucopolysaccharide that is irreversibly bound to collagen. The mucopolysaccharides are animal polysaccharides containing hexosamine residues such as hyaluronic acid, chondroitin sulfate or heparin sulfate.

U.S. Pat. No. 4,614,794 describes complexes formed between collagen and polyanionic polysaccharides from plants, for example sodium alginate. These complexes are preferably obtained at a pH value which is not higher than the isoelectric point of the protein. The complexes are the to be suited for a plurality of medical and surgical applicants.

Commercially available collagen products are typically made from collagen derived from the connective tissue, the skin, bones or tendons of mammals, for example from cattle, horses or pigs. As an alternative, collagen can be isolated from marine sponges, especially from sponges of the genus Chondrosia reniformis (Porifera, Demospongiae). Methods for isolation of collagen from marine sponges are disclosed in International patent application publication WO 01/64046 and German patent application DE 10 2005 008 416, for example.

It is known that products based on collagen, especially collagen products for application in the medical field, have to be sterilized during their manufacture. Conventional methods for sterilizing collagen products are irradiation thereof with gamma and/or beta rays, or fumigating the collagen products with ethylene oxide.

The disadvantages of the known sterilization methods for collagen products consist in that by irradiation with gamma rays and/or beta rays, the triple-helical conformation of the collagen in the collagen products is destroyed and the efficacy of the collagen, and thus of the product, is thereby impaired. Ethylene oxide is a toxic substance, and traces thereof may remain in the fumigated collagen product.

The aforementioned sterilization methods are, in addition, costly and time-consuming.

BRIEF SUMMARY OF THE INVENTION

An object of the present invention was therefore to provide a method for sterilizing collagen products whereby the aforementioned disadvantages of the conventional sterilization methods can be avoided.

This object is achieved by a method wherein an aqueous, collagen-containing solution or suspension, or an aqueous collagen preparation is sterilized before being further processed into a collagen product, by adding thereto an antimicrobially active agent (i.e., an antiseptic).

An aqueous collagen solution or an aqueous collagen suspension means a solution or suspension of collagen in water, especially purified water, or in an aqueous sodium chloride solution or Ringer's solution. A collagen preparation is understood to mean an aqueous collagen solution or suspension which contains, in addition, one or more other substances or compounds, for example pharmaceutical and/or cosmetic active substances, antioxidants, vitamins, agents for preventing foaming, colorants, pigments with coloring effect, thickening agents, plasticizers, humectants, surface-active agents, polysaccharides and other auxiliary substances known to those skilled in the art, but also the antiseptic agents provided for according to the invention.

DETAILED DESCRIPTION OF THE INVENTION

According to the method of this invention, a water-soluble agent having antimicrobial action, that is, an antiseptic, which may, for example, serve to prevent wound infections, is added to a solution or suspension containing collagen. Examples of such antimicrobially active agents are chlorhexidine, hexetidine, nitroxoline, octenidine, polyhexanide and Taurolin (=taurolidine).

Preferably, cationic antiseptics are utilized as antimicrobial agents. Examples of cationic, antimicrobial active agents are the salts of polyhexamethylene biguanide (=polyhexanide, PHMB), the salts of octenidine and of chlorhexidine. Concrete examples are chlorhexidine dihydrochloride, chlorhexidine diacetate, chlorhexidine-D-digluconate, octenidine dihydrochloride and octenidine disaccharin, the hydrochloride salt of polyhexamethylene biguanide being particularly preferred.

As an alternative to the above-mentioned salts of polyhexamethylene biguanide, of octenidine and of chlorhexidine, it is also possible to utilise benzalkonium chloride, cetylpyridinium chloride or taurolidine.

Polyhexamethylene biguanide salts comprise water-soluble oligomers having a broad range of action against bacteria and fungi. Preferably, PHMB of a mean molecular weight of 2300 to 3100, especially preferably of 2300 to below 2900, is used.

In the method according to the present invention, preferably, 100 parts of an aqueous collagen solution or preparation, with a collagen content of 0.5 to 3 percent by weight, are mixed with 0.05 to 1 part(s) of a 20% (w/w) aqueous solution of the antimicrobial active agent. The pH value of the collagen solution/preparation is preferably between 5 and 7, more preferably between 5 and 6.5. The pH value of the collagen solution/preparation can be set prior to adding the antiseptic solution. Following addition of the antiseptic, the collagen preparation can be either stored or immediately processed into the desired collagen products.

The process according to the invention thus permits variation of the antimicrobial active agent content over a broad range and to adapt the content to the demands that are to be placed on the product which will be produced from the collagen-containing preparation. This means that the antiseptically active agent can be added to the collagen solution, suspension or preparation in an amount that will lead to a content of antimicrobially active agent in the resultant collagen preparation of 0.1 to 40 percent by weight, especially preferably 0.5 to 4 percent by weight, relative to the dry matter of the collagen preparation.

The method according to the invention affords the advantages that:

the type and/or origin of the collagen represents no restriction;

the sterility of the collagen preparation prior to its being further processed, is ensured;

collagen preparations can be preserved for a long period of time prior to use thereof;

the compatibility of collagen with other ingredients contained in the preparation or in the products to be manufactured is not impaired;

the color and smell of the products to be manufactured is not adversely affected;

the viscosity of the collagen solution is slightly increased, which can be of advantage in the further processing of the collagen solution;

the amounts of antimicrobial active agent are relatively small, and the costs for the manufacture of collagen products are not considerably increased.

In one particular embodiment, a surface-active agent or a mixture of surface-active agents is added, in addition to the antiseptic, to the collagen solution, suspension or preparation, the surface-active agent preferably being present in the collagen preparation in amphoteric or non-ionogenic form so as not to adversely affect the action of the antiseptic, especially of the PHMB.

Surface-active agents which do not adversely affect the antimicrobial properties of PHMB are disclosed in International patent application publication WO 03/004013. These surface-active agents are glycine derivatives, sulfosuccinate derivatives and amide derivatives of fatty acids, each of which may be used either alone or in any desirable combination with one another.

The fatty acid of the glycine, sulfosuccinate and amide derivatives preferably has a chain length of from 10 to 18 carbon atoms and is preferably unbranched. Both saturated and unsaturated fatty acids are suitable. Especially preferred fatty acids are undecylenic, undecylic, lauric, stearic and ricinoleic acid or coconut fatty acid.

The glycine derivative preferably is a betaine derivative, especially preferably an amidoalkyl betaine derivative, of a fatty acid. The alkyl residue preferably is an ethyl group or propyl group. Examples of particularly suitable glycine derivatives are cocoamidopropyl betaine, laurdimethyl aminoalkyl betaine, ricinoleamidopropyl betaine and undecylene amidopropyl betaine.

The collagen preparation containing antiseptics may, in addition to or in place of the glycine derivative, contain a fatty acid amide and/or a fatty acid sulfosuccinate and/or a fatty acid amide. Though, in terms of their structure, sulfosuccinates are anionic compounds, they may, at an appropriate pH value of the solution, also be present in nonionic form, and it is in fact expedient to use them in this form.

As an alternative to the aforementioned surface-active agents, distearyl dimethyl ammonium chloride may be added to the collagen solution or preparation, as this cationic surface-active agent, according to International patent application publication WO 2004/032945, does not impair the antimicrobial action of PHMB-HCL, but even leads to a synergistic effect.

The surface-active agent or mixture of surface-active agents is preferably contained in the collagen preparation at a content of 0.01 to 1.5 percent by weight, more preferably of 0.03 to 1 percent by weight, and especially preferably of 0.05 to 0.4 percent by weight.

Before or after addition of the antiseptic and of the optional surface-active agent, at least one polysaccharide, preferably an anionic polysaccharide, may be added to the collagen solution/suspension or preparation. The anionic polysaccharide may be selected from the group consisting of alginates, hyaluronic acid and its salts (hyaluronates), pectins, carragheenans, xanthans, sulfated dextranes, cellulose derivatives, oxidized cellulose such as oxidized regenerated cellulose, and mixtures thereof.

Furthermore, chondroitin, chondroitin-4-sulfate, chondroitin-6-sulfate, heparin, heparan sulfate, keratan sulfate, dermatan sulfate, starch derivatives and other polyglycosides may also be used.

Preferably, anionic polysaccharides are utilized which at a pH value of 7 are essentially insoluble in water. Preferably, the anionic polysaccharide has a molecular weight which is above 20,000, especially preferably above 50,000.

Preferably, a polysaccharide in an amount of from 10 to 90 percent by weight, especially preferably from 25 to 75 percent by weight, relative to the dry weight of the preparation, is added to the collagen solution, suspension or preparation.

For carrying out the method according to the invention, it is irrelevant in what sequence the further substances or compounds are added to the collagen solution/suspension. Thus, the antiseptic can be added to the collagen solution/suspension as the first substance, but also as late as immediately prior to the further processing of a prefabricated collagen preparation that already contains, for example, polysaccharides and/or surface-active agents.

Further subjects of the present invention are collagen-containing preparations that can be obtained by the above-described methods.

Consequently, the invention relates to aqueous, collagen-containing preparations which are distinguished from the collagen preparations and products known from the state of the art in that they are self-sterilized and antiseptic.

Self-sterilized in this context means that microorganisms (bacteria, yeasts, molds and the like) accessing after sterilization, cannot propagate, but are killed effectively.

The collagen-containing preparations according to the invention contain at least one water-soluble, antiseptically active agent, which preferably is a cationic antiseptic. Suitable antiseptic agents may, for example, be the salts of chlorhexidine, the salts of octenidine or the salts of polyhexamethylene biguanide. Examples of suitable salts are polyhexamethylene biguanide hydrochloride, chlorhexidine dihydrochloride, chlorhexidine diacetate, chlorhexidine-D-digluconate, octenidine dihydrochloride and octenidine disaccharin. As an alternative, the collagen preparations according to the preparation may contain taurolidine.

Preferably, the collagen preparations contain the antimicrobial active agent of the antiseptically active agent in an amount of 0.1 to 40 percent by weight, more preferably of 0.5 to 4 percent by weight, relative to the dry weight of the collagen preparation.

Advantageously, the collagen-containing preparation contains a surface-active agent or a mixture of surface-active agents, preferably a surface-active agent or mixture of surface-active agents which is present in the collagen-containing preparation in amphoteric or nonionogenic form. These surface-active substances are glycine derivatives, sulfosuccinate derivatives and amide derivatives of fatty acids which preferably have a chain length of from 10 to 18 carbon atoms and which, in particular, are unbranched.

As an alternative, the collagen-containing preparation may contain distearyl dimethyl ammonium chloride.

Collagen-containing preparations according to the present invention may contain the surface-active agent or the mixture of surface-active agents in an amount of from 0.01 to 1.5 percent by weight, preferably in an amount of 0.03 to 1 percent by weight, and more preferably in an amount of 0.05 to 0.4 percent by weight.

In one particular embodiment, the collagen-containing preparation contains at least one polysaccharide, preferably an anionic polysaccharide.

Suitable polysaccharides may be selected from the group consisting of alginates, hyaluronic acid and its salts (hyaluronates), pectins, carragheenans, xanthans, sulfated dextranes, cellulose derivatives, oxidized cellulose such as oxidized regenerated cellulose, chondroitin, chondroitin-4-sulfate, chondroitin-6-sulfate, heparin, heparan sulfate, keratan sulfate, dermatan sulfate, starch derivatives, and mixtures thereof.

The polysaccharide portion contained in the collagen-containing preparations is preferably 10 to 90 percent by weight, preferably 25 to 75 percent by weight.

The collagen preparations according to the invention may either be further processed immediately after they have been produced, employing the methods known per se, or they may first be temporarily stored since the collagen preparations according to the invention have not only been sterilized but are moreover self-sterilizing.

The collagen-containing preparations according to the invention may advantageously be used for producing self-sterilized, antiseptic collagen products. Preferred collagen products are, for example, powders, microspheres, flakes, fibers, wovens, mats, films, membranes, sponges, ointments and gels, particularly for application in the cosmetic and/or medical fields. Especially preferred collagen products are wound dressings.

For example, collagen sponges can be produced by foaming a collagen-containing preparation according to the invention, or by removing the air contained therein under vacuum, filling the foamed or degassed collagen preparation into a mold, deep-freezing it and subsequently freeze-drying the deep-frozen collagen preparation.

Example 1

One liter of a 1% (w/w) aqueous collagen solution (pH 6.5) was vigorously mixed at room temperature with 20 ml of a 20% aqueous poly(hexamethylene biguanide)hydrochloride solution (Cosmocil® QC). After mixing, the viscosity of the preparation rose slightly because of the physical interaction between collagen and PHMB. The mixture thus obtained was cast in molds of polystyrene, polyethylene or polypropylene, deep-frozen at −40° C. and dried under vacuum (lyophilized).

Standard tests (agar diffusion tests) were carried out on the resultant collagen sponges in order to examine their antimicrobial effect. These agar diffusion tests were carried out using *Staphylococcus aureus*, *Pseudomonas aeruginosa* and *Candida albicans*, and showed an antimicrobial action of the collagen sponges that lasted for more than 120 hours.

Example 2

800 ml of the collagen/PHMB mixture of Example 1 were vigorously stirred at room temperature with 200 ml of an aqueous, 1% (w/w) sodium alginate solution. The collagen preparation thus obtained was cast in molds of polystyrene, polyethylene or polypropylene, deep-frozen at −40° C. and dried under vacuum (lyophilized).

Standard tests (agar diffusion tests) were carried out on the resultant collagen sponges in order to examine their antimicrobial effect. These agar diffusion tests were carried out using *Staphylococcus aureus*, *Pseudomonas aeruginosa* and *Candida albicans*, and showed an antimicrobial action of the collagen sponges that lasted for more than 120 hours.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a self-sterilized, antiseptic collagen preparation, the method comprising adding at least one water-soluble, antimicrobially active agent, at least one surface-active agent and at least one polysaccharide to an aqueous collagen solution or aqueous collagen suspension, the at least one antimicrobially active agent being selected from the group consisting of nitroxoline, polyhexanide, octenidine, salts of polyhexamethylene biguanide, salts of octenidine, polyhexamethylene biguanide hydrochloride, octenidine dihydrochloride and octenidine disaccharin, and the at least one surface-active agent being selected from the group consisting of glycine derivatives of fatty acids, sulfosuccinate derivatives of fatty acids, amide derivatives of fatty acids and distearyl dimethyl ammonium chloride, wherein the collagen preparation is self-sterilized and antiseptic and comprises 0.1 to 40 percent by weight of the at least one antimicrobially active agent and 10 to 90 percent by weight of the at least one polysaccharide, relative to the dry weight of the preparation.

2. The method according to claim 1, wherein the antimicrobially active agent is a cationic antimicrobial active agent.

3. The method according to claim 1, wherein the collagen preparation comprises 0.5 to 4 percent by weight of the at least one antimicrobially active agent, relative to the dry weight of the preparation.

4. The method according to claim 1, wherein the surface-active agent or a mixture of surface-active agents is added in an amount of from 0.01 to 1.5 percent by weight, relative to the resultant collagen preparation.

5. The method according to claim 1, wherein the preparation comprises at least one anionic polysaccharide.

6. The method according to claim 5, wherein the polysaccharide is selected from the group consisting of alginates, hyaluronic acid and its salts (hyaluronates), pectins, carragheenans, xanthans, sulfated dextranes, cellulose derivatives, oxidized cellulose, chondroitin, chondroitin-4-sulfate, chondroitin-6-sulfate, heparin, heparan sulfate, keratan sulfate, dermatan sulfate, starch derivatives, and mixtures thereof.

7. The method according to claim 5, wherein the polysaccharide is added in an amount of 25 to 75 percent by weight, relative to the dry weight of the collagen preparation.

8. An aqueous, collagen-containing preparation, which is self-sterilized and antiseptic, the preparation comprising at least one water-soluble, antimicrobially active agent, at least one surface-active agent and at least one polysaccharide, the at least one antimicrobially active agent being selected from the group consisting of nitroxoline, polyhexanide, octenidine, salts of polyhexamethylene biguanide, salts of octenidine, polyhexamethylene biguanide hydrochloride, octenidine dihydrochloride and octenidine disaccharin, and the at least one surface-active agent being selected from the group consisting of glycine derivatives of fatty acids, sulfosuccinates of fatty acids, amides of fatty acids and distearyl dimethyl ammonium chloride, wherein the collagen-containing preparation comprises 0.1 to 40 percent by weight of the at least one antimicrobially active agent and 10 to 90 percent by weight of the at least one polysaccharide, relative to the dry weight of the preparation.

9. The collagen-containing preparation according to claim 8, wherein the antimicrobially active agent is a cationic antimicrobial active agent.

10. The collagen-containing preparation according to claim 9, wherein it comprises 0.5 to 4 percent by weight of the at least one antimicrobially active agent, relative to the dry weight of the preparation.

11. The collagen-containing preparation according to claim 8, wherein the at least one surface-active agent is contained in the preparation in an amount of from 0.01 to 1.5 percent by weight.

12. The collagen-containing preparation according to claim 8, wherein the preparation contains at least one anionic polysaccharide.

13. The collagen-containing preparation according to claim 12, wherein the polysaccharide is selected from the group consisting of alginates, hyaluronic acid and its salts (hyaluronates), pectins, carragheenans, xanthans, sulfated dextranes, cellulose derivatives, oxidized cellulose, chondroitin, chondroitin-4-sulfate, chondroitin-6-sulfate, heparin, heparan sulfate, keratan sulfate, dermatan sulfate, starch derivatives, and mixtures thereof.

14. The collagen-containing preparation according to claim 12, wherein the amount of polysaccharide in the collagen-containing preparation is 25 to 75 percent by weight, relative to the dry weight of the preparation.

15. A self-sterilized, antiseptic collagen product containing the collagen-containing preparation according to claim 8.

16. The product according to claim 15, wherein the collagen product is selected from powders, microspheres, flakes, fibers, wovens, mats, films, membranes, sponges, wound dressings, ointments or gels.

17. A method for production of collagen sponges, the method comprising:
   (i) foaming or removing air under vacuum from a collagen-containing preparation which is self-sterilized and antiseptic, the preparation comprising at least one water-soluble, antimicrobially active agent and at least one polysaccharide, the at least one antimicrobial active agent being selected from the group consisting of nitroxoline, polyhexanide, octenidine, salts of polyhexamethylene biguanide, salts of octenidine, polyhexamethylene biguanide hydrochloride, octenidine dihydrochloride and octenidine disaccharin, wherein the collagen-containing preparation comprises 0.1 to 40 percent by weight of the at least one antimicrobially active agent and 10 to 90 percent by weight of the at least one polysaccharide, relative to the dry weight of the preparation,
   (ii) deep-freezing the foamed or degassed collagen preparation, and
   (iii) freeze-drying the deep-frozen collagen preparation.

18. The method of claim 17, wherein the collagen sponges have an antimicrobial action that lasts for more than 120 hours.

* * * * *